(12) United States Patent
Omote

(10) Patent No.: US 7,524,587 B2
(45) Date of Patent: Apr. 28, 2009

(54) NON-AQUEOUS ELECTROLYTE AND SECONDARY BATTERY CONTAINING SAME

(75) Inventor: Atsushi Omote, Osaka (JP)

(73) Assignee: Panasonic Corporation, Osaka (JP)

( * ) Notice: Subject to any disclaimer, the term of this patent is extended or adjusted under 35 U.S.C. 154(b) by 18 days.

(21) Appl. No.: 11/798,217

(22) Filed: May 11, 2007

(65) Prior Publication Data
US 2007/0275305 A1 Nov. 29, 2007

Related U.S. Application Data

(63) Continuation of application No. PCT/JP2006/322098, filed on Nov. 6, 2006.

(30) Foreign Application Priority Data

Nov. 10, 2005 (JP) ............................. 2005-325675
Jan. 23, 2006 (JP) ............................. 2006-013367

(51) Int. Cl.
*H01M 10/40* (2006.01)
*H01M 4/46* (2006.01)
*H01M 4/48* (2006.01)

(52) U.S. Cl. ................. 429/324; 429/218.1; 429/231.5; 429/326; 429/328; 429/339; 429/199; 429/201; 252/62.2

(58) Field of Classification Search ...................... None
See application file for complete search history.

(56) References Cited

U.S. PATENT DOCUMENTS 5,538,811 A * 7/1996 Kanbara et al. ............. 429/307
6,083,647 A 7/2000 Noda et al.

FOREIGN PATENT DOCUMENTS

| JP | 11-260400 | 9/1999 |
| JP | 2001-085011 | 3/2001 |
| JP | 2003-017058 | 1/2003 |

OTHER PUBLICATIONS

Machine translation of JP 2001-085011, Mar. 2001.*
International Search Report issued in International Patent Application No. PCT/JP2006/322098 dated Jan. 30, 2007.

* cited by examiner

*Primary Examiner*—Jonathan Crepeau
(74) *Attorney, Agent, or Firm*—McDermott Will & Emery LLP

(57) ABSTRACT

An aluminum secondary battery exhibiting favorable characteristics is provided. The present invention relates to a non-aqueous electrolyte comprising an electrolyte containing $Al(CF_3SO_3)_3$ and a room temperature molten salt of a quaternary ammonium salt where $CF_3SO_3^-$ is anion, and to an aluminum secondary battery containing that non-aqueous electrolyte.

7 Claims, 2 Drawing Sheets

NON-AQUEOUS ELECTROLYTE AND SECONDARY BATTERY CONTAINING SAME

REFERENCE TO RELATED APPLICATION

This Application is a continuation of International Application No. PCT/JP2006/322098, whose international filing date is Nov. 6, 2006, which in turn claims the benefit of Japanese Application No. 2005-325675 filed Nov. 10, 2005 and Japanese Application No. 2006-013367, filed Jan. 23, 2006, the disclosures of which Applications are incorporated by reference herein. The benefit of the filing and priority dates of the International and Japanese Applications is respectfully requested.

TECHNICAL FIELD

The present invention relates to a non-aqueous electrolyte and a secondary battery containing that electrolyte. The non-aqueous electrolyte of the present invention has Al salt solubility, a sufficiently wide potential window, and is useful as a non-aqueous electrolyte for an aluminum battery and electrodeposition of aluminum metal. In addition, the secondary battery of the present invention is particularly useful as an aluminum secondary battery using aluminum or an aluminum alloy for the anode active material.

BACKGROUND ART

Although Al batteries having a high energy density are currently expected to be used practically, they have only been realized for primary batteries using an aqueous solution for the electrolyte and some air batteries (see, for example, "Handbook of Batteries", Asakura Publishing Co., Ltd., p. 687, 1996).

As is disclosed in the "Handbook of Batteries", Asakura Publishing Co., Ltd., p. 687, 1996, aluminum air batteries have a high oxidation-reduction potential and hydrogen is generated as a result of electrolysis of the electrolyte in the form of water taking place on the anode. In addition, since hydroxide ions ($OH^-$) are used for the mobile ions, aluminum hydroxide is formed at the anode and since this is difficult to dissolve in water, it creates the problem of inhibiting discharge to the cathode. These problems are caused by the use of an aqueous electrolyte and the use of $OH^-$ ions for the mobile ions.

Several proposals have been made for realizing aluminum batteries by using ions other than $OH^-$ ions for the mobile ions through the use of a non-aqueous electrolyte. The Al salt, $AlCl_3$, in particular has long been known to comprise a room temperature molten salt and quaternary ammonium, and aluminum batteries have been disclosed that use this as a non-aqueous electrolyte (see, for example, Japanese Patent No. 2977252, Japanese Patent No. 3380930 and Japanese Patent Application Publication No. H3-238769).

Moreover, a non-aqueous electrolyte has also been disclosed that uses $Al^{3+}$ ions as mobile ions by using an Al salt other than $AlCl_3$ (see, for example, Japanese Patent Application Publication No. H6-52898).

In addition, batteries have been disclosed that have a non-aqueous electrolyte that uses lithium ions for the mobile ions, and use a carbon material for the material that occludes and releases aluminum ions (see, for example, Japanese Patent Application Publication No. 2003-163030 and Japanese Patent Application Publication No. H11-297355).

On the other hand, solid electrolytes have been disclosed that use ions of a trivalent metal, a specific example of which is $Al_2(WO_4)_3$, for the mobile ions. Since these electrolytes allow high-density charge transfer, they have been disclosed with respect to application to the electrolytes of some gas sensors and solid secondary batteries (see, for example, Japanese Patent Application Publication No. 2005-149982, Japanese Patent Application Publication No. H11-203935 and Japanese Patent Application Publication No. H10-255822).

Materials having the same crystal structure as $Al_2(WO_4)_3$ and so on are known to be materials having low thermal expansion (see, for example, Japanese Patent Application Publication No. 2003-89572).

Electrode active materials for non-aqueous electrolyte secondary batteries are known that are composed of compounds represented by the formula $M_2(MoO_4)_3$ (wherein, M is at least one type of element selected from the group of elements included in group 13 of the periodic table such as Al) (see, for example, Japanese Patent Application Publication No. 2001-85011).

Moreover, compounds have also been disclosed that have a tungsten-bronze structure represented by $Al_xWO_3$ as typical compound oxides of Al, W and Mo (see, for example, Mat. Res. Bull., Vol. 2, pp. 809-817 (1967) and C.R. Acad. Sc. Paris, t.266, serie C, pp. 1066-1068 (1968)).

DISCLOSURE OF THE INVENTION

Although salts (such as NaCl) typically have a high melting point, room temperature molten salts are special liquids that have a melting point at or below room temperature and maintain a liquid state at room temperature despite being salts composed of cations and anions. On the other hand, non-aqueous electrolytes of batteries and so on are composed of an electrolyte containing desired mobile ions and a solution that dissolves that electrolyte.

Since the room temperature molten salts utilizing $AlCl_3$ disclosed in Japanese Patent No. 2977252, Japanese Patent No. 3380930 and Japanese Patent Application Publication No. H3-238769 form complex ions of aluminum chloronate ions ($AlCl_4^-$, $Al_2Cl_7^-$), there is the risk of the generation of chlorine gas during electrochemical reactions, and since they are not suitable as electrolytes for batteries with respect to such factors as the toxicity and corrosiveness of chlorine gas, they are not used practically.

In addition, the cathode active materials indicated thereby are materials that occlude and release aluminum chloronate ions, and there are no descriptions regarding the occlusion and release of aluminum ions.

In Japanese Patent Application Publication No. H6-52898, vanadium pentoxide and an electrically conductive polymer are disclosed as cathode active materials that occlude and release aluminum ions using $Al^{3+}(CF_3SO_3^-)_3$ as the electrolyte salt. In addition, a mixed solvent of ethylene carbonate and diethyl carbonate is used as a non-aqueous electrolyte solution.

However, according to studies conducted by the inventors of the present invention, $Al^{3+}(CF_3SO_3^-)_3$ was completely insoluble in the mixed solvent, and dissociation of aluminum salt was unable to be confirmed. Although the inventors of the present invention also attempted to dissolve $Al^{3+}(CF_3SO_3^-)_3$ in polar organic solvents such as tetrahydrofuran and acetonitrile known to normally have high solubility, it was insoluble in these solvents as well. Consequently, the properties as an electrolyte were unable to be confirmed, and findings were unable to be obtained regarding the occlusion and release of aluminum ions by the cathode active materials of vanadium pentoxide and the electrically conductive polymer indicated here.

Japanese Patent Application Publication No. 2003-163030 and Japanese Patent Application Publication No. H11-297355 disclose various imidazolium salts and quaternary ammonium salts used as non-aqueous electrolytes for lithium secondary batteries. These non-aqueous electrolytes use a lithium salt for the electrolyte, and lithium ions for the mobile ions. There is no mention made regarding the mobility of aluminum ions or the solubility of $Al(CF_3SO_3)_3$ with respect to room temperature molten salts.

The Handbook of Batteries (Asakura Publishing Co., Ltd., p. 687, 1996) discloses $LiWO_2$ and $LiMoO_2$ composed of Li and W or Mo as anode active materials. $Al_xWO_3$, which is presumed to have similar effects thereto, is disclosed in Mat. Res. Bull., Vol. 2, pp. 809-817 (1967) and C.R. Acad. Sc. Paris, t.266, serie C, pp. 1066-1068 (1968), and $Al_xWO_3$ is also thought to be able to occlude and release Al according to the range of x.

$Al_xWO_3$ is indicated to have a tungsten-bronze structure within the range of x of 0<x<0.03 according to Mat. Res. Bull., Vol. 2, pp. 809-817 (1967), and within the range of x of 0.105<x<0.135 according to C.R. Acad. Sc. Paris, t.266, serie C, pp. 1066-1068 (1968).

However, although a stable crystal structure with respect to occlusion and release of Al is assumed to be maintained within the above-mentioned ranges, since the range of x is quite narrow, and the charge-discharge capacity is too small even if it was able to be used as a cathode (or anode) active material. Accordingly, it is not suitable for secondary battery applications.

On the other hand, Japanese Patent Application Publication No. H11-203935 discloses a solid electrolyte in the form of a compound oxide that mobilizes trivalent metal ions. Japanese Patent Application Publication No. H10-255822 also discloses a solid battery that uses this for the electrolyte.

However, Japanese Patent Application Publication No. H11-203935 and Japanese Patent Application Publication No. H10-255822 only disclose high-temperature behavior (400° C. or higher), while there is no disclosure made regarding the behavior of the metal ions or the stability of the crystal structure of these compounds at room temperature. In addition, there are no practical examples of their use as cathode active materials of aluminum secondary batteries.

Japanese Patent Application Publication No. 2003-89572 discloses a tungsten mixed oxide composed of bivalent and tetravalent metal ions having the same crystal structure.

However, this application also does not make any disclosures regarding the behavior of the metal ions and the stability of the crystal structure at room temperature.

As has been described above, there have been no examples thus far of simultaneously realizing a cathode active material capable of occluding and releasing aluminum ions and a non-aqueous electrolyte using aluminum ions for the mobile ions.

Thus, a primary object of the present invention is to provide an aluminum secondary battery that demonstrates favorable characteristics.

As a result of conducting extensive studies in consideration of the problems of the prior art, the inventors of the present invention found that $Al(CF_3SO_3)_3$ favorably dissolves in a room temperature molten salt of a specific quaternary ammonium salt, thereby leading to completion of the present invention.

Namely, the present invention relates to the non-aqueous electrolyte described below.

1. A non-aqueous electrolyte comprising an electrolyte containing $Al(CF_3SO_3)_3$ and a room temperature molten salt of a quaternary ammonium salt; wherein, the quaternary ammonium salt is at least one type of compound represented by the following general formula (1) or (2):

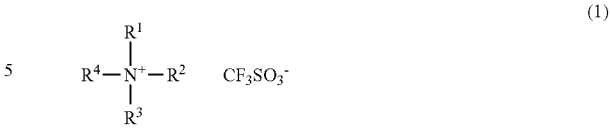

(where, $R^1$ to $R^4$ are the same or different and represent an alkyl group, and $R^1$ and $R^2$ may form a ring);

(where, $R^5$ to $R^7$ are the same or different and represent an alkyl group, and $R^5$ and $R^6$ may form a ring).

2. The non-aqueous electrolyte of claim 1, wherein the alkyl group are an alkyl group having 1 to 6 carbon atoms.

3. The non-aqueous electrolyte of claim 1, further containing a non-aqueous organic solvent.

4. The non-aqueous electrolyte of claim 3, wherein the non-aqueous organic solvent contains at least one type selected from the group consisting of propylene carbonate, ethylene carbonate, dimethyl carbonate, diethyl carbonate and ethyl methyl carbonate.

5. A secondary battery comprising an anode, a non-aqueous electrolyte and a cathode, wherein the non-aqueous electrolyte is the non-aqueous electrolyte of claim 1.

6. The secondary battery of claim 5, wherein the active material in the anode is at least one type of aluminum and aluminum alloy.

7. The secondary battery of claim 5, wherein the active material in the cathode is an oxide represented by the following general formula (3):

$$(Al_xM_{1-})_2(M'O_4)_3 \qquad (3)$$

(where, M represents $M^2{}_aM^3{}_bM^4{}_c$, $M^2$ represents at least one type of bivalent metal element selected from Mg, Ca, Sr and Ba, $M^3$ represents at least one type of trivalent metal element selected from Sc, Y, Ga and In, $M^4$ represents at least one type of tetravalent metal element selected from Zr and Hf, M' represents a hexavalent metal element including W or Mo, $0 \leq a < 1$, $0 \leq b < 1$, c=a, $0 < x \leq 1$ and $(2a/(1-x))+(3b/(1-x))+(4c/(1-x))=3$).

BEST MODE FOR CARRYING OUT THE INVENTION

1. Non-Aqueous Electrolyte

Figure 1:
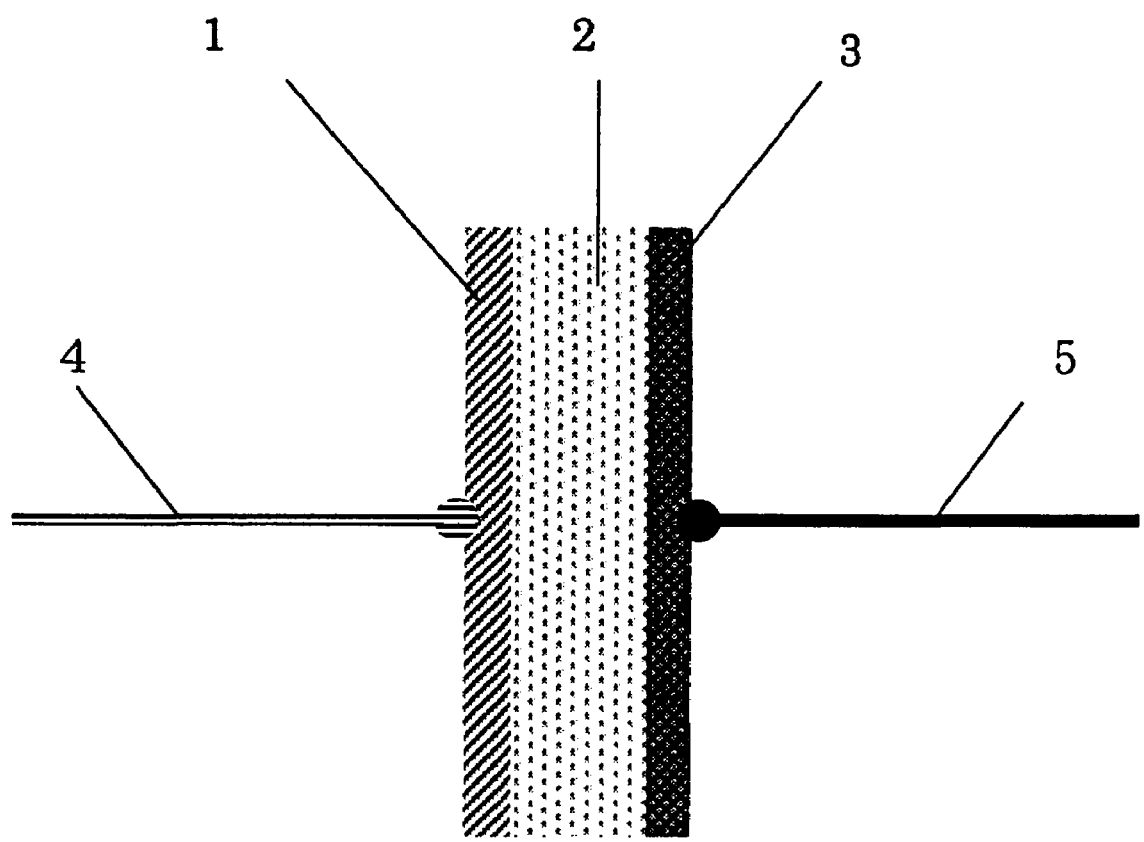
FIG. 1 is a schematic drawing of an aluminum concentration cell fabricated in (Example 4) in the examples of a non-aqueous electrolyte.

The non-aqueous electrolyte of the present invention is a non-aqueous liquid electrolyte comprising an electrolyte containing $Al(CF_3SO_3)_3$ and a room temperature molten salt of a quaternary ammonium salt, wherein the quaternary ammonium salt is at least one type of compound represented by the following general formula (1) or (2):

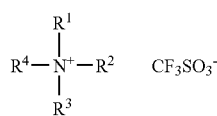
(1)

wherein $R^1$-$R^4$ are the same or different and represent an alkyl group, and $R^1$ and $R^2$ may form a ring;

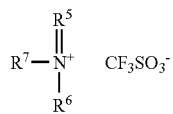
(2)

wherein $R^5$-$R^7$ are the same or different and represent an alkyl group, and $R^5$ and $R^6$ may form a ring.

Although the electrolyte containing $Al(CF_3SO_3)_3$ may contain an electrolyte other than $Al(CF_3SO_3)_3$, in the present invention, an electrolyte substantially consisting of $Al(CF_3SO_3)_3$ is used preferably.

There are no particular limitations on the concentration of the $Al(CF_3SO_3)_3$ in the non-aqueous electrolyte. Although the concentration can be suitably set according to the type of quaternary ammonium salt used and so on, it is normally from about 0.05 to about 2.0 mol/L and preferably from 0.05 to 1.0 mol/L.

As described above, the room temperature molten salt of a quaternary ammonium salt contains at least one type of room temperature molten salt of a quaternary ammonium salt represented by general formula (1) (to also be referred to as "quaternary ammonium salt (1)") and a room temperature molten salt of a quaternary ammonium salt represented by general formula (2) (to also be referred to as "quaternary ammonium salt (2)").

In either of these ambient temperature molten salts, the anion is $CF_3SO_3^-$. Namely, a quaternary ammonium salt is used that has $CF_3SO_3^-$ as an anion. As was also indicated in Japanese Patent Application Publication No. H6-52898, Japanese Patent Application Publication No. 2003-163030 and Japanese Patent Application Publication No. H11-297355, examples of anions of room temperature molten salts include $N(CF_3SO_2)^-$, $C(CF_3SO_2)_3^-$, $CF_3SO_3^-$, $C_2F_5SO_3^-$, $C_4F_9SO_3^-$, $BF_4^-$, $PF_6^-$, $Al_2Cl_7^-$, $AlCl_4^-$ and $ClO_4^-$. However, it is necessary to select $CF_3SO_3^-$ among these anions in order to dissolve the $Al(CF_3SO_3)_3$. When other anions such as $N(CF_3SO_2)^-$, $BF_4^-$, and $PF_6^-$ are selected, the $Al(CF_3SO_3)_3$ cannot be dissolved. This is the most significant feature of the present invention.

$R^1$ to $R^4$ of quaternary ammonium salt (1) may be the same or different and represent an alkyl group. There are no particular limitations on the alkyl group, and examples include linear or branched alkyl group such as methyl group, ethyl group, n-propyl group, isopropyl group, n-butyl group, isobutyl group, tert-butyl group, pentyl group, hexyl group, heptyl group or octyl group. Among these, alkyl group having 1 to 6 carbon atoms are preferable in terms of allowing the obtaining of a favorable molten state at room temperature. In the case of alkyl groups having 7 or more carbon atoms, the melting point of the room temperature molten salt tends to rise, and tends not to melt at room temperature.

$R^1$ and $R^2$ of quaternary ammonium salt (1) may also form a ring, examples of which include pyrrolidinium salts of monoazine quaternary ammonium five-membered ring and piperazinium salts of six-membered ring. In the present invention, the quaternary ammonium salt (1) preferably does not have a ring structure.

Specific examples of cations of the quaternary ammonium salt (1) (ammonium compounds) include at least one type such as tetramethyl ammonium, tetraethyl ammonium, tetrapropyl ammonium, dimethyl diethyl ammonium, trimethyl ethyl ammonium, trimethyl propyl ammonium or trimethyl n-butyl ammonium. In addition, examples of compounds that form a ring include at least one type such as 1-methyl-1-butyl pyrrolidinium, 1-ethyl-1-butyl pyrrolidinium, 1-methyl-1-ethyl piperazinium, 1-propyl-1-butyl piperazinium or 1-methyl-1-butyl piperazinium.

$R^5$ to $R^7$ of the quaternary ammonium salt (2) may be the same or different and represent alkyl groups. The same alkyl groups listed as examples of alkyl groups for the quaternary ammonium salt (1) may be used, namely linear or branched alkyl group such as methyl group, ethyl group, n-propyl group, isopropyl group, n-butyl group, isobutyl group, tert-butyl group, pentyl group, hexyl group, heptyl group or octyl group. Among these, alkyl groups having 1 to 6 carbon atoms are preferable in terms of allowing the obtaining of a favorable molten state at room temperature.

$R^5$ and $R^6$ of the quaternary ammonium salt (2) may also form a ring, examples of which include monoazine quaternary ammonium pyridinium salts (six-membered ring), diazine quaternary ammonium imidazolium salts (five-membered ring), pyrimidinium salts and pyridazinium salts (six-membered ring). The quaternary ammonium salt (2) preferably has a ring structure, and one or more double bonds are preferably present in that ring structure.

Specific examples of cations (ammonium compounds) of the quaternary ammonium salt (2) include at least one type such as 1-butyl imidazolium, 1-ethyl-3-methyl imidazolium, 1-butyl-3-methyl imidazolium, 1-hexyl-3-methyl imidazolium, 1,3-diethyl imidazolium, 1-ethyl-2,3-dimethyl imidazolium, 1-ethyl pyridinium, N-butyl pyridinium and 3-ethyl-N-butyl pyridinium. Among these quaternary ammonium compounds, imidazolium salts, pyridinium salts and quaternary ammonium salts having four alkyl groups are preferable since many melt at ambient temperature.

The concentration of quaternary ammonium salts (1) and (2) in the non-aqueous electrolyte (total amount of both in the case of combining the use of both) can be suitably set according to the type of quaternary ammonium salt used and so on.

Furthermore, known or commercially available salts can also be used for these quaternary ammonium salts (1) and (2). In addition, these can be synthesized according to known production processes.

The non-aqueous electrolyte of the present invention may also contain other additives and so on as necessary. In particular, the present invention preferably contains a non-aqueous organic solvent. According to studies conducted by the inventors of the present invention, the viscosity of a room temperature molten salt of a quaternary ammonium salt of the present invention was determined to increase as a result of dissolving an Al salt. If the solution viscosity of a room temperature molten salt increases, the ion diffusion becomes rate-limiting and ionic conductivity decreases. Consequently, the resistance of the non-aqueous electrolyte increases resulting in the risk of increased loss due to internal resistance in the case of a battery. In contrast, as a result of containing a non-aqueous organic solvent in the non-aqueous electrolyte, the solution viscosity decreases, thereby enabling ionic conductivity to be further enhanced.

A typical organic solvent which dissolves in the room temperature molten salt may be used as the non-aqueous organic solvent used by mixing with a room temperature molten salt. Examples include at least one type such as propylene carbonate, ethylene carbonate, dimethyl carbonate, diethyl carbonate or ethyl methyl carbonate. Among these, those having a comparatively wide potential window and low solution viscosity are more preferable.

The content of the non-aqueous organic solvent can be suitably set corresponding to the need to increase solution viscosity and ionic conductivity at the time of use. However, since these non-aqueous organic solvents do not dissolve the electrolyte Al, the amount of the non-aqueous organic solvent is preferably 50 vol % or less in the non-aqueous electrolyte. If the amount of the non-aqueous organic solvent is 20 vol % or less (and particularly from 0.1 to 20 vol % and even more particularly from 1.0 to 10 vol %), a non-aqueous electrolyte can be provided that adequately dissolves Al, thereby making this more preferable.

2. Secondary Battery

The present invention includes a secondary battery (and particularly an aluminum secondary battery) comprising an anode, a non-aqueous electrolyte and a cathode, wherein the non-aqueous electrolyte is the non-aqueous electrolyte of the present invention is used for the non-aqueous electrolyte.

Other than using the non-aqueous electrolyte of the present invention for the non-aqueous electrolyte, constituent elements of known secondary batteries (aluminum secondary batteries) can also be employed in the secondary battery of the present invention. For example, the coin cell shown in FIG. 2 can be employed. In this coin cell, an anode 22 is disposed on an anode case 21. Gasket 25 are disposed on the ends of the anode case. In addition, a cathode cased 27 is fixed around the periphery of the gasket 25. A cathode 26 is formed on the inside of the cathode case 27. A separator 24 is interposed between the anode 22 and the cathode 26. An electrolyte 23 (non-aqueous electrolyte) is filled between the anode and cathode and the separator.

The materials of these members are known. For example, the anode case 21 and the cathode case 27 are made of stainless steel. The material of the separator 24 is a porous film made of polypropylene. The gasket 25 is a insulating gasket made of polypropylene.

At least one type of aluminum and aluminum alloy is preferably used as an anode active material for the anode. Examples of aluminum alloys include Al—Au, Al—Ga, Al—In, Al—Mn, Al—Ni, Al—Pt and Al—Si.

There are no particular limitations on the cathode, and a cathode used in known aluminum secondary batteries and so on can be used. In the present invention, an oxide represented by the following general formula (3):

$$(Al_xM_{1-x})_2(M'O_4)_3 \quad (3)$$

(wherein, M represents $M^2{}_aM^3{}_bM^4{}_c$, $M^2$ represents at least one type of bivalent metal element selected from the group consisting of Mg, Ca, Sr and Ba, $M^3$ represents at least one type of trivalent metal element selected from the group consisting of Sc, Y, Ga and In, $M^4$ represents at least one type of tetravalent metal element selected from the group consisting of Zr and Hf, M' represents a hexavalent metal element including W or Mo, $0 \leq a<1$, $0 \leq b<1$, $c=a$, $0<x \leq 1$ and $(2a/(1-x))+(3b/(1-x))+(4c/(1-x))=3$) is preferably used as a cathode active material.

The above-mentioned oxide is able to occlude and release aluminum ions at ambient temperature, and is optimal as a cathode active material of an aluminum secondary battery. In general, these compounds (oxides) are such that a tungstic acid tetrahedron represented by $WO_4{}^{2-}$ or $MoO_4{}^{2-}$ forms a layered structure in which a trivalent metal element $M^{3+}$ (or bivalent metal element $M^{2+}$ or tetravalent metal element $M^{4+}$) is arranged between the layers. Consequently, the above-mentioned compounds exhibit ionic conductivity by metal ions at 400° C. or higher in particular. Almost all compound oxides that exhibit ionic conductivity are thought to involve movement of oxygen ions. In contrast, in the above-mentioned compounds, since the tungsten and molybdenum that compose the $WO_4{}^{2-}(MoO_4{}^{2-})$ in the above compounds strongly bind oxygen ions, trivalent metal ions located between the layers in particular are thought to move instead of the oxygen ions.

The cathode active material of the present invention has a rhombohedral system in all of the compositions of the above-mentioned general formula. However, crystal systems other than those described above may be included within a range that does not impair the effects of the present invention.

Since the cathode active material of the present invention maintains a stable crystal structure as a result of the tungstic acid tetrahedron composing the main skeleton thereof being resistant to the effects of occlusion and release of interlayer metal ions, is can be preferably used as a cathode active material for a secondary battery. Moreover, the space between layers is increased by substituting Al with other divalent, trivalent or tetravalent metal ions, thereby enabling aluminum ions having a small ionic radius to be easily occluded and released.

The cathode active material of the present invention may be produced by a liquid phase process, gaseous phase process or solid phase process provided an oxide (compound oxide) having a composition as described above can be obtained. A solid phase reaction method can be applied as a solid phase process, a coprecipitation method, sol gel method or a hydrothermal reaction method can be applied as a liquid phase process, and a sputtering method or CVD method can be applied as a gaseous phase process.

More specifically, the material of the present invention can be preferably produced by, for example, a solid phase process like that described below. A typical mixed oxide can be produced by kneading and crushing a raw material in the form of a metal oxide using an apparatus such as a ball mill followed by firing and carrying out crushing and so forth as necessary.

Compounds able to serve as a supply source of each element (compounds containing at least one type of Al, $M^2$, $M^3$, $M^4$ and M') can each be preferably used as starting materials.

Examples of these compounds include oxides, hydroxides, carbonates, nitrates, chlorides, acetates, oxalates, metal alkoxides, metal acetyl acetonates, metal acetates, metal methacrylates and metal acrylates. In addition, compounds containing two or more of these elements can also be used.

In the present invention, additives (such as binders and firing assistants) normally used in the production of green compacts can also be incorporated as necessary in addition to these starting materials.

These starting materials are weighed and mixed so as to obtain the material composition of the present invention. There are no limitations on the mixing method, and known methods can be employed. For example, mixing can be preferably carried out using an apparatus capable of kneading and crushing such as a crusher, ball mill, planetary mill or media mill (such as an attriter or vibration mill). Kneading and crushing may be carried out using a wet method or a dry method. The mean particle diameter of the mixed powder is typically controlled to be within the range from about 0.1 to from about 2 μm.

Next, the resulting mixed powder is fired. The firing conditions typically consist of a temperature of about 650 to about 1000° C. in an oxidative atmosphere or air. The calcining time can be suitably determined according to the calcining temperature and so on.

The resulting fired powder can also be crushed as necessary. A method similar to that previously described is used for the crushing method. The powder can also be classified as necessary.

Electrode formation may be carried out in accordance with a known method. For example, a known additive such as a conductivity assistant (such as carbon powder) or binder (resin binder) may be mixed with the active material followed by forming the electrode into a desired shape (such as a sheet).

There are no limitations on the type of battery, and a coin type, cylindrical type, square type or sheet type and so on can be employed.

Battery assembly may also be carried out in accordance with a known method corresponding to the type of battery. For example, in the case of a coin cell as previously described, the cathode 26 is first pressed onto the cathode case 27, the gaskets 25 are attached to the peripheral edges, the electrolyte 23 is dropped thereon, and separator 24 is placed thereon, and the electrolyte 23 is again dropped thereon. An assembly in which the anode 22 has been pressed onto the anode case 21 in advance is then fit together and then sealed with a press to produce the desired coin cell.

The coin cell produced in the manner described above was evaluated for the characteristics thereof in section "2) entitled <Examples> of Aluminum Secondary Batteries" described to follow by charging and discharging at a constant current within a voltage range of 1.5 to 2.5 V at a current value of 0.1 mA per unit surface area of the cathode plate.

EXAMPLES

The following provides a more detailed explanation of the characteristics of the present invention by indicating examples and comparative examples thereof. However, the scope of the present invention is not limited by the examples.

Furthermore, the examples are divided into 1) (Examples) of Non-Aqueous Electrodes and 2)<Examples> of Aluminum Secondary Batteries.

1) (Examples) of Non-Aqueous Electrolytes

Example 1

The solubility of $Al(CF_3SO_3)_3$ in room temperature molten salts was evaluated. 50 mM (M indicates mol/L) $Al(CF_3SO_3)_3$ was added to each room temperature molten salt and stirred for 24 hours followed by visually confirming the state thereof (presence or absence of undissolved solid).

Furthermore, since $Al(CF_3SO_3)_3$ is a white powder while all of the room temperature molten salts used in the present example are clear liquids (except for some light yellow clear liquids), solubility can be visually evaluated easily. Those results are shown in Table 1.

TABLE 1

| Sample No. | Room Temperature Molten Salt | Melting Point (° C.) | Evaluation of Solubility |
|---|---|---|---|
| 1 | EMI-BF$_4$ | 15 | X |
| 2 | EMI-TFSI | (Liquid) | Δ |
| 3 | EMI-CF$_3$SO$_3$ | −12 | ○ |
| 4 | BMI-BF$_4$ | −71 | X |
| 5 | BMI-PF$_6$ | −80 | X |

TABLE 1-continued

| Sample No. | Room Temperature Molten Salt | Melting Point (° C.) | Evaluation of Solubility |
|---|---|---|---|
| 6 | BMI-TFSI | (Liquid) | Δ |
| 7 | BMI-CF$_3$SO$_3$ | 17 | ○ |
| 8 | BMI-CF$_3$CO$_2$ | −50 | X |
| 9 | MBPy-CF$_3$SO$_3$ | −50 | ○ |
| 10 | BMPr-TFSI | −50 | Δ |
| 11 | BMPr-CF$_3$SO$_3$ | 3 | ○ |
| 12 | TMA-TFSI | (Liquid) | Δ |
| 13 | TMEA-TSFI | (Liquid) | Δ |
| 14 | EDiMBA-TFSI | −11 | X |
| 15 | DiMDiEA-CF$_3$SO$_3$ | (Liquid) | ○ |

* Evaluation Solubility:
○: Completely soluble
Δ: Partially soluble
X: Insoluble
* Abbreviations for Room Temperature Molten Salt:
EMI: 1-ethyl-3-methyl imidazolium
BMI: 1-butyl-3-methyl imidazolium
MBPy: N-methyl-3-butyl pyridium
BMPr: 1-butyl-1-methyl pyrrolidinium
TMA: Tetramethyl ammonium
TMEA: Trimethyl ethyl ammonium
EDiMBA: Ethyl dimethyl butyl ammonium
DiMDiEA: Diethyl dimethyl ammonium
TFSI: Bis-trifluorosulfonylimide As shown in Table 1, solubility with respect to $Al(CF_3SO_3)_3$ was confirmed to differ considerably depending on the type of anion of the room temperature molten salt.

The white powder of $Al(CF_3SO_3)_3$ hardly dissolved at all in room temperature molten salts having $BF_4^-$ or $PF_6^-$ and so on as an anion, and precipitated in the sample molten salt. Although $Al(CF_3SO_3)_3$ was partially soluble in room temperature molten salts having $N(CF_3SO_2)_2^-$ as an anion, when 50 mM $Al(CF_3SO_3)_3$ was added, a white powder precipitated without dissolving in the sample molten salt. Although these samples were heated to 60° C. and stirred, there were no significant changes in the state of the precipitates, and these room temperature molten salts were determined to have hardly any solubility with respect to $Al(CF_3SO_3)_3$.

In contrast, in the case of samples in which $Al(CF_3SO_3)_3$ was added to a room temperature molten salt having $CF_3SO_3^-$ for an anion, a white powder was virtually unable to be confirmed within a few hours. These samples become completely clear after 24 hours, thereby confirming that $Al(CF_3SO_3)_3$ dissolved well therein.

On the basis of these results, selection of the anion that composes the room temperature molten salt is important for determining the solubility with respect to $Al(CF_3SO_3)_3$, and $Al(CF_3SO_3)_3$ was determined to be completely dissolved in the case of a room temperature molten salt having $CF_3SO_3^-$ for an anion.

Example 2

Next, solubility was evaluated for samples 3, 7 and 9, in which the Al salt dissolved well in (Example 1), by changing the concentration of the Al salt. Room temperature ionic conductivity using the alternating current impedance method and viscosity were evaluated for those samples demonstrating adequate solubility. Those results are shown in Table 2.

TABLE 2

| Sample No. | Room Temperature Molten Salt | Al Salt Concentration (mol/L) | Evaluation of Solubility | Ionic Conductivity (S·cm$^{-1}$, 25° C.) | Solution Viscosity (mPa·s) |
|---|---|---|---|---|---|
| 3 | EMI-CF$_3$SO$_3$ | 0.05 | ○ | 45 | 34 |
|   |   | 0.5 | ○ | 20 | 42 |
|   |   | 1.0 | ○ | 18 | 48 |
|   |   | 2.0 | ○ | 5 | 60 |
| 7 | BMI-CF$_3$SO$_3$ | 0.05 | ○ | 19 | 75 |
|   |   | 0.5 | ○ | 10 | 84 |
|   |   | 1.0 | ○ | 5 | 91 |
|   |   | 2.0 | ○ | 1 | 103 |
| 9 | MBPy-CF$_3$SO$_3$ | 0.05 | ○ | 20 | 105 |
|   |   | 0.5 | ○ | 14 | 112 |
|   |   | 1.0 | ○ | 8 | 140 |
|   |   | 2.0 | ○ | 2 | 198 |

\* Evaluation Solubility:
○: Completely soluble
Δ: Partially soluble
X: Insoluble
\* Abbreviations for Room Temperature Molten Salt:
EMI: 1-ethyl-3-methyl imidazolium
BMI: 1-butyl-3-methyl imidazolium
MBPy: N-methyl-3-butyl pyridium The Al salt was determined to dissolve well up to a concentration of 2M for each of the samples 3, 7 and 9. Although solution viscosity increased and ionic conductivity gradually decreased as the Al salt concentration increased, ionic conductivity was still high and well within the range of practical use as a non-aqueous electrolyte, thereby making it possible to realize a non-aqueous electrolyte using aluminum ions as mobile ions.

Example 3

Mixed solvents with non-aqueous organic solvents were assessed using the BMI-CF$_3$SO$_3$ non-aqueous electrolyte of sample 7 used in (Examples 1) and (Example 2) above. Propylene carbonate (PC), diethyl carbonate (DEC) and ethyl methyl carbonate (DMC) were each mixed at 0, 10, 20, 50 and 70 vol % for use as the non-aqueous organic solvents, and these were evaluated for solubility (visual evaluation) and by measuring ionic conductivity and solution viscosity. The concentration of the Al salt was 1.0 M in all cases. Those results are shown in Table 3.

TABLE 3

| Room Temperature Molten Salt | Mixed Solvent | Organic Solvent Mixing Ratio | Evaluation of Solubility | Ionic Conductivity (S·cm-1, 25° C.) | Solution Viscosity (mPa·s) |
|---|---|---|---|---|---|
| BMI-CF$_3$SO$_3$ | PC | 0 | ○ | 5 | 90 |
|   |   | 10 | ○ | 15 | 78 |
|   |   | 20 | ○ | 30 | 61 |
|   |   | 50 | Δ | 54 | 41 |
|   |   | 70 | X | — | 28 |
|   | DEC | 0 | ○ | 4 | 90 |
|   |   | 10 | ○ | 28 | 68 |
|   |   | 20 | ○ | 43 | 52 |
|   |   | 50 | X | — | 35 |
|   |   | 70 | X | — | 19 |
|   | DMC | 0 | ○ | 5 | 91 |
|   |   | 10 | ○ | 26 | 65 |
|   |   | 20 | ○ | 48 | 52 |
|   |   | 50 | Δ | 62 | 32 |
|   |   | 70 | X | — | 14 |

\* Evaluation Solubility:
○: Completely soluble
Δ: Partially soluble
X: Insoluble
\* Abbreviations for Room Temperature Molten Salt:
BMI: 1-butyl-3-methyl imidazolium Solution viscosity was determined to decrease and ionic conductivity was determined to increase as a result of mixing in a non-aqueous organic solvent. Although ionic conductivity increased up to a concentration of 20 vol %, the Al salt was found to no longer be soluble when the non-aqueous organic solvent was mixed at a concentration of 50 vol %.

Example 4

An aluminum concentration cell was fabricated using the 1 M Al salt non-aqueous electrolyte produced in Example 3 in which the ratio of BMI-CF$_3$SO$_3$ to PC was 90:10. An aluminum plate designated as an anode 1 and a platinum plate designated as a cathode 2 were immersed in the non-aqueous electrolyte 3 followed by measurement of discharge potential. A schematic drawing of the fabricated aluminum concentration cell is shown in FIG. 1.

In the concentration cell, a potential difference can be generated according to the aluminum concentrations of the cathode and anode, and discharge stops when the concentrations of both become equal. The discharge potential was initially measured to be 0.99 V. During this time, there were no abnormalities at the interface between the cathode and anode in the non-aqueous electrolyte. After the concentration cell had finished discharging, an elementary analysis was carried out on the surface of the platinum used for the cathode. Aluminum was detected from the electrode, thereby confirming that aluminum had precipitated or formed an alloy with the platinum, while also confirming that an aluminum concentration cell had been formed.

On the basis of this result, the non-aqueous electrolyte of the present invention was determined to use aluminum ions as mobile ions and be effective as an electrolyte of an aluminum battery.

2)<Examples> of Aluminum Secondary Batteries

Example 1

Figure 2:
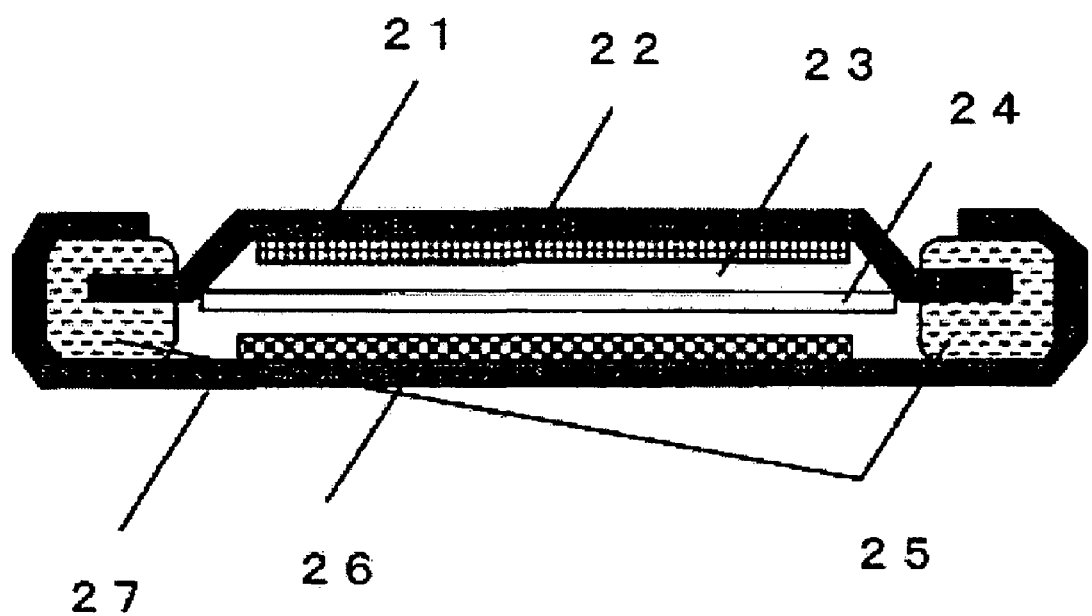
FIG. 2 is a schematic drawing of a coin cell fabricated in <Examples> relating to an aluminum secondary battery.

A coin cell was fabricated using $Al_2(MoO_4)_3$ for the cathode active material (FIG. 2). The $Al_2(MoO_4)_3$ used for the cathode active material was obtained by adequately mixing and crushing $Al(OH)_3$ and $MoO_3$ at a molar ratio of 2:3, firing for 4 hours at 850° C. and adequately crushing with a crusher followed by confirming that the crystal system was a single rhombohedral system by powder X-ray diffraction measurement.

The resulting cathode active material was mixed and kneaded with carbon powder and a binder in the form of poly-4-fluoride ethylene powder at a weight ratio of 100:25:5.

After adequately kneading, the resulting slurry was rolled onto a sheet. This was then punched out into the shape of a disc having a diameter of 13.0 mm for use as a cathode 26. At this time, the weight of the electrode plate was made to be 25 mg.

Continuing, an electrolyte 23 was produced in the manner described below. 50 mM (M indicates mol/L) $Al(CF_3SO_3)_3$ was added to a room temperature molten salt in the form of $BMI-CF_3SO_3$ (butyl methyl imidazolium-trifluoromethane sulfonate) followed by stirring for 24 hours and using as the electrolyte 23 after confirming that the Al salt had adequately dissolved.

An aluminum sheet having a thickness of 100 μm was punched out to a diameter of 13.5 mm and used for an anode 22.

A coin cell was assembled from these components and charging and discharging characteristics were evaluated, and the discharge capacity per cathode active material was determined. Those results are shown in Table 4.

Example 2

A coin cell was fabricated using $Al_{0.5}Sc_{0.5}(MoO_4)_3$ for the cathode active material.

The $Al_{0.5}Sc_{0.5}(MoO_4)_3$ cathode active material was obtained by adequately mixing and kneading $Al(OH)_3$, $ScCO_3$ and $MoO_3$ at the desired molar ratio, firing for 4 hours at 850° C. and adequately crushing with a crusher followed by using as a cathode active material after confirming that the crystal system was a single rhombohedral system by powder X-ray diffraction measurement.

A coin cell was assembled in the same manner as <Example 1> with the exception of the cathode active material. The charging and discharging characteristics of the fabricated coil cell were evaluated, and the discharge capacity per cathode active material was determined. Those results are shown in Table 4.

Comparative Example 1

A coin cell was fabricated in the same manner as <Example 1> and <Example 2> using a carbon powder for the cathode active material.

The carbon powder was the same as that used in <Example 1>, and the carbon powder and binder in the form of 4-poly-fluoride ethylene powder were mixed and kneaded at a weight ratio of 50:5 to produce a cathode 22.

The charging and discharging characteristics of the fabricated coin cell were evaluated, and the discharge capacity per cathode active material was determined. Those results are shown in Table 4.

Comparative Example 2

A coin cell was fabricated in the same manner as <Example 1> and <Example 2> using $AlV_3O_9$ for the cathode active material.

The $AlV_3O_9$ cathode active material was obtained by adequately mixing and crushing $Al(OH)_3$ and $V_2O_5$ at a molar ratio of 2:3, firing for 6 hours at 750° C. and adequately crushing followed by using as a cathode active material after confirming that the crystal system was a monoclinic system by powder X-ray diffraction measurement.

The charging and discharging characteristics of the fabricated coin cell were evaluated, and the discharge capacity per cathode active material was determined. Those results are shown in Table 4.

Comparative Example 3

A coin cell was fabricated in the same manner as <Example 1> and <Example 2> with the exception of using $FeS_2$ for the cathode active material.

Commercially available reagent-grade $FeS_2$ was used for the $FeS_2$. The charging and discharging characteristics of the fabricated coin cell were evaluated, and the discharge capacity per cathode active material was determined. Those results are shown in Table 4.

TABLE 4

| | Cathode Active Material | $1^{st}$ Cycle Discharge Capacity (mAh/g) | Discharge Capacity After Two Cycles (mAh/g) | Discharge Capacity After Five Cycles (mAh/g) |
|---|---|---|---|---|
| Example 1 | $Al_2(MoO_4)_3$ | 272 | 270 | 271 |
| Example 2 | $Al_{1.0}Sc_{1.0}(MoO_4)_3$ | 125 | 123 | 123 |
| Comp. Ex. 1 | Carbon Powder | 21 | 11 | 8 |
| Comp. Ex. 2 | $AlV_3O_9$ | 98 | 22 | 4 |
| Comp. Ex. 3 | $FeS_2$ | 85 | 36 | 30 |

* Electrolyte: 50 mM $Al(CF_3SO_3)_3$/$BMI-CF_3SO_3$

According to Table 4, the coin cells fabricated in <Comparative Examples 1>, <Comparative Examples 2> and <Comparative Examples 3> demonstrated low discharge capacity, and the discharge capacity was found to decrease as charging and discharging were repeated.

In contrast, in the cases of <Examples 1> and <Example 2> using a cathode active material of the present invention, the discharge capacity was high and aluminum secondary batteries having favorable cycle characteristics were determined to be obtained.

Example 3

A coin cell using $(Al_xSc_{1-x})_2(WO_4)_3$ as an cathode active material was fabricated for <Example 3>.

The $(Al_xSc_{1-x})_2(WO_4)_3$ cathode active material was obtained by adequately mixing and crushing $Al(OH)_3$, $ScCO_3$ and $WO_3$ at the desired molar ratio, firing for 4 hours at 1000° C. and adequately crushing with a crusher followed by using as a cathode active material after confirming that the crystal system was a single rhombohedral system by powder X-ray diffraction measurement.

Cathode active materials were produced by respectively using values of 0, 0.2, 0.4, 0.6, 0.8 and 1.0 for the value of x in the above-mentioned formula.

Coin cells were assembled using these cathode active materials along with the same electrolyte and anode used in <Example 1> and <Example 2> to respectively obtained coin cells 3-1, 3-2, 3-3, 3-4, 3-5 and 3-6.

The charging and discharging characteristics of the fabricated coin cells were evaluated, and the discharge capacity per cathode active material was determined. Those results are shown in Table 5.

particular, aluminum secondary batteries were able to be obtained that demonstrated both superior cycle characteristics and discharge capacity.

Example 4

Coin cells were fabricated using the cathode active materials and electrolytes shown in Table 6. An anode, a separator and others are provided the same as in <Example 1>.

The charging and discharging characteristics of the fabricated coin cells were evaluated, and the discharge capacity per cathode active material was determined. Those results are shown in Table 6.

TABLE 6

| | Electrolyte | Cathode Active Material | 10th Cycle Discharge Capacity (mAh/g) | 100th Cycle Discharge Capacity (mAh/g) |
|---|---|---|---|---|
| 4-1 | Electrolyte: 100 mM, | $Al_{1.6}Sc_{0.2}In_{0.2}(MoO_4)_3$ | 205 | 203 |
| 4-2 | $Al(CF_3SO_3)_3$ | $Al_{1.6}Mg_{0.2}Hf_{0.2}(WO_4)_3$ | 142 | 145 |
| 4-3 | Room temperature molten salt: $BMI-CF_3SO_3$ + PC (90:10) | $Al_{1.0}In_{0.4}Ca_{0.3}Zr_{0.3}(MoO_4)_3$ | 122 | 121 |
| 4-4 | Electrolyte: 50 mM, | $Al_{1.6}Sc_{0.2}In_{0.2}(MoO_4)_3$ | 207 | 207 |
| 4-5 | $Al(CF_3SO_3)_3$ | $Al_{1.6}Mg_{0.2}Hf_{0.2}(WO_4)_3$ | 130 | 122 |
| 4-6 | Room temperature molten salt: $EMI-CF_3SO_3$ + DME (90:10) | $Al_{1.0}In_{0.4}Ca_{0.3}Zr_{0.3}(MoO_4)_3$ | 119 | 115 |
| 4-7 | Electrolyte: 50 mM, | $Al_{2.0}(MoO_4)_3$ | 254 | 230 |
| 4-8 | $Al(CF_3SO_3)_3$ Room temperature molten salt: $BPy-CF_3SO_3$ (100) | $Al_{2.0}(WO_4)_3$ | 185 | 171 |

Explanation of abbreviations
EMI: 1-ethyl-3-methyl imidazolium
BMI: 1-butyl-3-methyl imidazolium
BPy: 1-n-butyl pyridium
PC: Propylene carbonate
DME: 1,2-Dimethoxy-ethane

TABLE 5

| Coin Cell | Cathode Active Material | 10th Cycle Discharge Capacity (mAh/g) | Discharge Capacity after 50 cycles (mAh/g) | Discharge Capacity after 100 Cycles (mAh/g) |
|---|---|---|---|---|
| 3-1 | $Al_{0.0}Sc_{2.0}(WO_4)_3$ | 1 | 0 | 1 |
| 3-2 | $Al_{0.4}Sc_{1.6}(WO_4)_3$ | 5 | 15 | 18 |
| 3-3 | $Al_{0.8}Sc_{1.2}(WO_4)_3$ | 44 | 56 | 52 |
| 3-4 | $Al_{1.2}Sc_{0.8}(WO_4)_3$ | 89 | 95 | 92 |
| 3-5 | $Al_{1.6}Sc_{0.4}(WO_4)_3$ | 123 | 122 | 128 |
| 3-6 | $Al_{2.0}Sc_{0.0}(WO_4)_3$ | 165 | 156 | 145 |

* Electrolyte: 50 mM $Al(CF_3SO_3)_3/BMI-CF_3SO_3$

Electrolyte: 50 mM $Al(CF_3SO_3)_3/BMI-CF_3SO_3$

As shown in Table 5, the discharge capacity when x=0 was nearly zero, and occlusion and release of aluminum was unable to be observed.

Occlusion and release of aluminum was possible within the range of $0<x\leq1$ (coin cells 3-2, 3-3, 3-4, 3-5 and 3-6), and favorable secondary aluminum secondary batteries were obtained. Changes in discharge capacity were observed corresponding to the value of x. In coin cells 3-5 and 3-6 in As shown in Table 6, although several combinations of electrolytes and cathode active materials were examined, aluminum secondary batteries were able to be obtained demonstrating favorable cycle characteristics regardless of the electrolyte and cathode active material.

Compound oxides of molybdic acid (coin cells 4-1, 4-3 and 4-7) were found to allow the obtaining of higher discharge capacities than compound oxides of tungstic acid (coin cells 4-2, 4-5 and 4-8).

ADVANTAGES OF THE INVENTION

According to the present invention, a non-aqueous electrolyte is able to be provided that uses aluminum ions for the mobile ions. Consequently, the non-aqueous electrolyte of the present invention is useful as a non-aqueous electrolyte for an aluminum battery, electrodeposition of aluminum metal and so on.

Since the aluminum secondary battery as claimed in the present invention is able to demonstrate favorable cycle characteristics, it can be widely used as a secondary battery of, for example, portable information terminals (such as notebook PCs and cell phones) and electric automobiles.

INDUSTRIAL APPLICABILITY

The non-aqueous electrolyte of the present invention has superior Al salt solubility, and is useful as a non-aqueous electrolyte for aluminum batteries and electrodeposition of aluminum metal.

In addition, the aluminum secondary battery of the present invention exhibits favorable cycle characteristics, enabling it to be used as a secondary battery over a wide range of applications such as portable information terminals (such as notebook PCs and cell phones) and electric automobiles.

The invention claimed is:

1. A non-aqueous liquid electrolyte comprising an electrolyte containing $Al(CF_3SO_3)_3$ and a room temperature molten salt of a quaternary ammonium salt, wherein the quaternary ammonium salt is at least one type of compound represented by the following general formula (1) or (2):

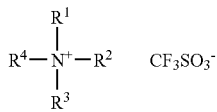 (1)

wherein $R^1$-$R^4$ are the same or different and represent an alkyl group, and $R^1$ and $R^2$ may form a ring;

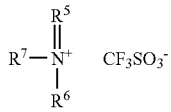 (2)

wherein $R^5$-$R^7$ are the same or different and represent an alkyl group, and $R^5$ and $R^6$ may form a ring.

2. The non-aqueous electrolyte according to claim 1, wherein the alkyl group has 1 to 6 carbon atoms.

3. The non-aqueous electrolyte according to claim 1, further containing a non-aqueous organic solvent.

4. The non-aqueous electrolyte according to claim 3, wherein the non-aqueous organic solvent contains at least one type selected from the group consisting of propylene carbonate, ethylene carbonate, dimethyl carbonate, diethyl carbonate and ethyl methyl carbonate.

5. A secondary battery comprising an anode, a non-aqueous liquid electrolyte and a cathode, wherein the non-aqueous liquid electrolyte is the non-aqueous liquid electrolyte according to claim 1.

6. The secondary battery according to claim 5, wherein the active material in the anode is at least one type of aluminum and aluminum alloy.

7. The secondary battery according to claim 5, wherein the active material in the cathode is an oxide represented by the following general formula (3):

$$(Al_xM_{1-x})_2(M'O_4)_3 \qquad (3)$$

wherein M represents $M^2{}_a M^3{}_b M^4{}_c$, $M^2$ represents at least one type of bivalent metal element selected from Mg, Ca, Sr and Ba, $M^3$ represents at least one type of trivalent metal element selected from Sc, Y, Ga and In, $M^4$ represents at least one type of tetravalent metal element selected from Zr and Hf, M' represents a hexavalent metal element including W or Mo, and $0 \leq a < 1$, $0 \leq b < 1$, $c=a$, $0 < x \leq 1$ and $(2a/(1-x))+(3b/(1-x))+(4c/(1-x))=3$.

* * * * *

UNITED STATES PATENT AND TRADEMARK OFFICE
CERTIFICATE OF CORRECTION

PATENT NO. : 7,524,587 B2
APPLICATION NO. : 11/798217
DATED : April 28, 2009
INVENTOR(S) : Atsushi Omote It is certified that error appears in the above-identified patent and that said Letters Patent is hereby corrected as shown below:

In Column 4, Line 41, change, "$(Al_xM_{1\text{-}})_2(M'O_4)_3$" to --$(Al_xM_{1-x})_2(M'O_4)_3$--.

Signed and Sealed this

Eighth Day of September, 2009

David J. Kappos
*Director of the United States Patent and Trademark Office*